United States Patent [19]

Nakamura

[11] Patent Number: 5,727,162

[45] Date of Patent: Mar. 10, 1998

[54] TOUCH SCREEN CASH REGISTER THAT DISPLAYS MERCHANDISE KEYS BASED ON SALES INFORMATION

[75] Inventor: Yasuhide Nakamura, Yamatokoriyama, Japan

[73] Assignee: Sharp Kabushiki Kaisha, Osaka, Japan

[21] Appl. No.: 460,185

[22] Filed: Jun. 2, 1995

[30] Foreign Application Priority Data

Dec. 29, 1994 [JP] Japan ..................... 6-340089

[51] Int. Cl.$^6$ .................................................. G06F 17/60
[52] U.S. Cl. ........................................................ 395/225
[58] Field of Search .................. 364/405; 235/375–385; 377/14; 360/60–80

[56] References Cited

U.S. PATENT DOCUMENTS

| | | | |
|---|---|---|---|
| 4,949,256 | 8/1990 | Humble et al. | 364/401 |
| 5,297,030 | 3/1994 | Vassigh et al. | 364/405 |
| 5,510,976 | 4/1996 | Moderi et al. | 364/405 |
| 5,524,195 | 6/1996 | Clanton, III et al. | 395/155 |

FOREIGN PATENT DOCUMENTS

| | | |
|---|---|---|
| 2-51720 | 2/1990 | Japan . |
| 2-109113 | 4/1990 | Japan . |
| 4-281514 | 10/1992 | Japan . |
| 5-216574 | 8/1993 | Japan . |

*Primary Examiner*—Gail D. Hayes
*Assistant Examiner*—Barton L. Bainbridge
*Attorney, Agent, or Firm*—Nixon & Vanderhye P.C.

[57] ABSTRACT

Labelled item keys displayed on a touch sensitive display screen of a merchandise register (e.g., a POS terminal) are dynamically changed during operation of the register in accordance with a particular sale and/or previous sales. Information regarding all traded merchandise items is retained in a memory. Sales information relating to each merchandise item is updated and reorganized within the memory during the registration of each sale. After completion of each sales registration, merchandise items are ordered according to selected sales information associated with each merchandise item. In one example, a hierarchial ranking according to sales volume is created for all traded items. In addition, a key arrangement storing memory stores key arrangement data that specifies a particular positional arrangement or layout for displaying item identification indicia within a limited number of merchandise keys that are displayed on the touch sensitive display screen. A preferred positional arrangement for displaying various merchandise keys is based on the relative rankings of respective merchandise items. A key arrangement control process changes the key arrangement data in accordance with changes in the ranking of an item so that the relative display positions of item indicia on displayed merchandise item keys will reflect the updated hierarchial ranking of each item. A display control process then reads the updated key arrangement data and displays the new positions of item indicia on the merchandise item keys of the display.

10 Claims, 17 Drawing Sheets

FIG. 5

| KEY POSITION | HARD CODE |
|---|---|
| 1 | 1 0 |
| 2 | 1 2 |
| 3 | 1 8 |
| 4 | 2 8 |
| 5 | 2 0 |
| 6 | 2 4 |

FIG. 6

| KEY POSITION | SOFT CODE |
|---|---|
| 1 | 0 1 |
| 2 | 0 2 |
| 3 | 0 5 |
| 4 | 0 4 |
| 5 | 0 3 |
| 6 | 0 6 |

FIG. 8

| SOFT CODE | KEY NAME | ITEM CODE |
|---|---|---|
| 01 | COFFEE | 001 |
| 02 | COKE | 002 |
| 03 | CAKE | 003 |
| 04 | ORANGE | 004 |
| 05 | APPLE | 005 |
| 06 | STEAK | 006 |

FIG. 9

| ITEM CODE | QUANTITY | AMOUNT | STOCK | UNIT PRICE |
|---|---|---|---|---|
| 001 | 3 | 1050 | 50 | 350 |
| 002 | 2 | 160 | 98 | 80 |
| 003 | 1 | 300 | 50 | 300 |
| 004 | 6 | 1200 | 20 | 200 |
| 005 | 0 | 0 | 10 | 200 |
| 006 | 7 | 14000 | 35 | 1200 |

FIG. 10

| ORDER | ITEM CODE | QUANTITY |
|---|---|---|
| 1 | 0 0 6 | 7 |
| 2 | 0 0 4 | 6 |
| 3 | 0 0 1 | 3 |
| 4 | 0 0 2 | 2 |
| 5 | 0 0 3 | 1 |
| 6 | 0 0 5 | 0 |

| KEY POSITION | SOFT CODE |
|---|---|
| 1 | 0 6 |
| 2 | 0 4 |
| 3 | 0 1 |
| 4 | 0 2 |
| 5 | 0 3 |
| 6 | 0 5 |

16, 33, 34

| ORDER | KEY POSITION |
|---|---|
| 1 | 20 |
| 2 | 15 |
| 3 | 10 |
| 4 | 5 |
| 5 | 19 |
| 6 | 14 |
| 7 | 9 |
| 8 | 4 |
| ⌇ | |
| 49 | 3 |
| 50 | 7 |

| ITEM CODE | 0:00 | | 1:00 | | 2:00 | | ~ | 23:00 | |
|---|---|---|---|---|---|---|---|---|---|
| | QUANTITY | AMOUNT | QUANTITY | AMOUNT | QUANTITY | AMOUNT | | QUANTITY | AMOUNT |
| 001 | 10 | 100 | 2 | 20 | 2 | 20 | | 0 | 0 |
| 002 | 0 | 0 | 0 | 0 | 1 | 200 | | 2 | 400 |
| 003 | 3 | 360 | 1 | 120 | 0 | 0 | | 0 | 0 |
| 004 | 0 | 0 | 0 | 0 | 0 | 0 | | 0 | 0 |
| 005 | 1 | 10 | 1 | 10 | 10 | 100 | | 1 | 10 |
| 006 | 1 | 100 | 1 | 100 | 10 | 1000 | | 1 | 100 |
| 007 | 5 | 10 | 1 | 2 | 10 | 20 | | 1 | 2 |
| 008 | 1 | 1000 | 1 | 1000 | 10 | 10000 | | 1 | 1000 |
| ~ | | | | | | | | | |
| 049 | 0 | 0 | 0 | 0 | 0 | 0 | | 0 | 0 |
| 050 | 0 | 0 | 0 | 0 | 0 | 0 | | 0 | 0 |

TOUCH SCREEN CASH REGISTER THAT DISPLAYS MERCHANDISE KEYS BASED ON SALES INFORMATION

BACKGROUND OF THE INVENTION

1. Field of the Invention

The present invention relates to a merchandise register suitably implemented for a POS (point-of-sale) terminal, a electronic cash register, etc.

2. Description of the Related Art

In recent years, merchandise registers for storing unit prices of merchandise, stock quantity, sales quantity, sales amount, etc. in correspondence to item codes for respective product items (hereinafter "product item" is described as "item"), are used as input devices for POS terminals, etc. Such merchandise registers are provided with input and display means, such as touch panels having light transmitting touch keys arranged in a matrix form and display means such as CRT (cathode ray tube), etc.

The operator inputs information by pressing a key at the position corresponding to the key position displayed on the screen of the display means which is arranged in such a way that a touch panel is placed on the screen, for example. The key arrangement indicates information, etc. to be inputted in the area corresponding to the touch keys of the screen with the use of characters, etc. by operating certain touch keys and also indicates in which part of the screen the corresponding area is located. The key arrangement can be set as desired according to the mode of use in the operation and is determined with a setting operation made in advance by the operator.

FIG. 25 is a block diagram showing a simplified functional construction of a merchandise register of the prior art. Input is made by pressing, etc., the input means of input and display means 1, namely touch key, etc. The output signal from the input and display means 1 is provided to the key input control means 2. The key input control means 2 determines on the basis of the stored content of a key arrangement storing memory 3 which area included in the key arrangement currently displayed is indicated by the output signal, and supplies the data set in that corresponding area to the merchandise registration means 4. The merchandise registration means 4 performs registration by operating and storing in memory, etc. the sales information of merchandise on the basis of the inputted data.

Moreover, display control means 5 reads the data of the key arrangement to be displayed from the key arrangement storing memory 3 and displays it on the display means of the input and display means 1. A plurality of different kinds of tables storing the key arrangements are provided and the operator can select from the plurality of key arrangements by prescribed operations such as pressing a page switching key of the input and display means 1, for example. Such prior art for selecting a plurality of key arrangements is disclosed in Japanese Unexamined Patent Publication JPA 4-281514 (1992).

The present applicant has previously proposed a system capable of freely and easily changing the setting of the key arrangement in Japanese Unexamined Patent Publication JPA 2-51720 (1990). In this document, the data on key arrangement for each processing picture displayed on the display means of the input and display means is constituted by combining information such as key shape, position, item code corresponding to respective keys, etc. and is stored unitarily in the form of tables. The information on key shape can be shared for a plurality of processing pictures, making it possible to reduce the amount of information relating to key arrangement. It is also possible to easily change the key arrangement by changing the combination of key shape, key position and item code.

Moreover, Japanese Unexamined Patent Publication JPA 9-109113 (1990) discloses a system for reducing the number of page switching operations during an input operation when a group of keys used for the input operation exists over a plurality of pages. In this reference, key groups which are frequently and simultaneously used are combined to constitute one and the same page according to the intended use and are stored in one table. The operator produces an input by using the key group of the page suitable for the intended use and can thus reduce the number of page switching operations.

Furthermore, Japanese Unexamined Patent Publication JPA 5-216574 (1993) discloses a system for automatically changing the key arrangement as well to those corresponding to the respective programs each time the program to be executed is changed.

In the respective prior art documents described above, the key arrangement is unitarily decided in advance and does not change in accordance with the use of keys by the individual operators. On a merchandise register, there are cases where frequently used keys such as those used for the registration of merchandise sales in large quantities, for example, are located at positions that are difficult to distinguish from the general arrangement of the key group if the sales amount of merchandise, etc. is not taken into account in designing of the key arrangement, and this causes a problem of poor operability of the register.

SUMMARY OF THE INVENTION

An object of the present invention is to provide a merchandise register capable of changing the key arrangement based on sales information obtained at the point in time when the merchandise register is used.

The invention provides a merchandise register comprising an input and display means for inputting a traded product item, a quantity, and functions necessary for its registration; sales information storing means for storing sales information including sales quantity and sales amount for each item; and means for registering a sales quantity and a sales amount cumulatively in the sales information storing means in response to the output of the input and display means, wherein the input and display means comprises merchandise input means for displaying merchandise input keys individually corresponding to respective items, the merchandise input means comprising a key panel display arrangement having a plurality of input keys displayed on touch sensitive display screen, display means on which merchandise keys of the key panel are displayed in "piles" (i.e., rows and columns) on a display screen, and a control means for controlling the display means so that item information regarding a particular item is displayed in a region on the display corresponding to an associated displayed key in the key panel (a particular merchandise key being constituted by a display of the key and its associated item information displayed in a corresponding region for the key), and an item code corresponding to an item associated with an operated merchandise key is outputted in response to the operation of the merchandise keys, and wherein the control means changes the arrangement of the merchandise keys by changing the display position of the item information on the basis of the stored sales information.

Moreover, the invention is characterized in that the merchandise input means comprises:

order judging means for calculating an index for each item on the basis of the sales information and for judging (i.e., determining/assigning) the order of the item (i.e., its relative position/level in a hierarchial ranking) on the basis of the magnitude of the index, order storing means for storing a key position representing an arranged position on a display of each key in the key panel and a number representing a linkage order for each key with respect to each other, and setting means for setting a number representing order corresponding to the key position for the order storing means, and that the control means changes the arrangement of the merchandise keys by referring to the order storing means on the basis of the results of an evaluation by the order judging means.

Furthermore, the invention is characterized in that the control means changes the arrangement of the merchandise keys at prescribed hours.

Still further, the present invention is characterized in that the order judging means changes the "positional" order (i.e., hierarchial ranking) of an item with that of an item one position higher in order when the index of an item has exceeded the sum of the index of the item one position higher in order and a prescribed value.

Additionally, the invention is characterized in that the input and display means comprises switching means for activating and disabling the change of arrangement of the merchandise keys by the control means.

In addition, the invention is characterized in that the sales information storing means stores the sales information of respective items up to the previous day for every prescribed time zone, and that the control means changes the arrangement of merchandise keys on the basis of the sales information up to the previous day for the time zone concerned at the starting hours for the respective time zones.

Moreover, the invention is characterized in that the sales information storing means stores the stock quantity of each item, and that the control means constitutes merchandise keys by displaying the stock quantity together with merchandise information.

Furthermore, the invention is characterized in that the control means displays neither merchandise information nor stock quantity for an item when the stock quantity is zero.

Additionally, the invention is characterized in that the input and display means comprises code input means capable of directly inputting the item codes of all traded items, that the number of merchandise keys provided in the merchandise input means is selected to be smaller than the number of all traded items, and that the control means selects the item which constitutes the merchandise key on the basis of sales information.

The invention is also characterized in that the order judging means judges the order of items by using sales quantity or sales amount as an index, and that the input and display means comprises selecting means for selecting either sales quantity or sales amount as an index.

In the merchandise register according to the invention, item codes representing the items traded, and the traded quantities, etc. are inputted by using input and display means. The sales quantity and the sales amount determined from the inputted items and the traded quantities are cumulatively added to the sales quantity and sales amount of the sales information stored in the sales information storing means to update the sales information.

Moreover, the input and display means for inputting item codes and quantities of items is provided with merchandise input means constituted with merchandise keys which correspond individually to the respective items. The merchandise input means is provided by arranging a key panel having a plurality of light transmitting keys on the screen of the display means. In addition, the merchandise keys are constituted by displaying merchandise information showing merchandise in the screen areas corresponding to the respective keys of the key panel. As certain keys of the key panel constituting the merchandise keys are operated, the item code corresponding to the merchandise information displayed in the areas corresponding to the keys of the display means is inputted into the merchandise register. Therefore, the operator will know the kinds of items inputted in the merchandise register as he operates the respective keys.

As the merchandise key is operated, the item code corresponding to the operated merchandise key is inputted and the sales information is updated. This makes it possible to input a item code, which previously was inputted by operating a plurality of ten-keys etc. by operating a single merchandise key. Consequently, the input operation of item codes can be simplified. Moreover, the arrangement of merchandise keys can be changed by way of the control means for automatically changing the display position of the merchandise information based on the sales information.

Moreover, according to the present invention, the arrangement of merchandise keys of the merchandise input means is changed on the basis of the order of items by changing the display position of the merchandise information at a position prescribed according to their order. The order of an item is determined based on the magnitude of index, which is calculated on the basis of the sales information of the item, each time the registration for any single transaction is completed. This makes it possible to change the arrangement of merchandise keys according to the sales information of the merchandise. Therefore, it becomes possible to automatically arrange frequently used merchandise keys in positions that are easy for operation, for example. It also becomes possible to know the index magnitude, namely differences of sales information of merchandise, etc. by looking at the arrangement of merchandise keys.

Furthermore, the prescribed positions are stored in a state which maintains correspondence between key positions which indicate the position of arrangement of the respective keys on the key panel constituting the merchandise input means and the number representing orders. In addition, this predetermined position can be set in advance by the operator by using the setting means. This makes it possible for the operator to decide, as desired, the arrangement of merchandise keys which is changed based on the sales information.

Additionally, according to the present invention, since the arrangement of merchandise keys is changed at prescribed hours, it is possible to limit the time of change of arrangement to specified hours such as once per hour, etc.

Moreover, according to the present invention, the replacement of the order of items of lower order with that of a higher order is made when the index of an item has exceeded the value which is the sum of the index of the item of an order higher by one position and a prescribed value. This makes it possible to prevent the order of merchandise from being replaced each time any item is registered and the index is changed.

Furthermore, according to the present invention, the operator can select as desired whether to keep the arrangement of merchandise keys in a state changeable according to sales information or to always keep it in a fixed state.

Additionally, according to the present invention, the sales information storing means stores the sales information of respective items up to the previous day by time zones stipulated in advance. In addition, the arrangement of merchandise keys is changed based on the sales information up to the previous day of the time zone concerned, at the starting hour of the respective time zones. Therefore, it is possible to change the arrangement of merchandise keys to an arrangement suitable for the time zone concerned at the starting hour even when the order of items is variable in each time zone.

Furthermore, according to the invention, the sales information storing means stores the stock quantities for respective merchandise items. Such stock quantities are displayed on the merchandise keys of the merchandise input means together with merchandise information. This enables the operator to grasp the stock condition of merchandise by looking at the merchandise input means.

Still further, according to the invention, no merchandise key of an item, the stock quantity of which is zero, is provided because an item which is zero is not displayed on the display means.

According to the invention, the input and display means also comprises code input means capable of directly inputting the item codes of all items dealt with, in addition to merchandise input means for inputting item codes of a specified item. In addition, since the number of merchandise keys provided in the merchandise input means is selected to be smaller than the number of all items dealt with, the specified items constituting the merchandise keys are determined based on the sales information. This makes it possible to provide merchandise keys corresponding to items satisfying certain conditions such as large sales quantity, etc.

Furthermore, according to the invention, either sales quantity or sales amount is used as an index for determining the order of merchandise and the operator can select one or the other to use as the index.

As described above, according to the invention, in a merchandise register for processing and registering sales information including the sum of sales quantities and sales amounts of the merchandise dealt with, the arrangement of merchandise keys corresponding to the respective items is changed based on the order of items determined according to the sales information. Moreover, the key arrangement corresponding to the order may be predetermined by the operator. In addition, either sales quantity or sales amount may be used as index for determining the order. This makes it possible to automatically arrange merchandise keys of items with large sales quantities or sales amounts, namely merchandise keys frequently used with large number of times of registration and use, in positions easy for operation near numerical keys, etc., for example. It is therefore possible to improve the operability of the apparatus. Furthermore, because the arrangement of merchandise keys is determined based on the order of sales calculated from sales quantities or sales amounts, it is possible to judge the best selling item, etc. by just looking at the merchandise input means. As a result, it becomes unnecessary to separately provide means for displaying the situation of sales, etc.

Furthermore, according to the invention, the arrangement of merchandise keys is changed at prescribed hours. In addition, such change of arrangement of merchandise keys is made when the index of an item has exceeded the value which is the sum of the index of the merchandise of an order and a prescribed value. This makes it possible to prevent the order of merchandise from being frequently replaced each time when any item is registered in the merchandise register. This enables further improvement of operability of this apparatus. Moreover, it becomes possible to know the timing of change of arrangement in advance by performing the change of arrangement of merchandise keys at prescribed hours.

According to the present invention, it is also possible to selectively activate or disable changing of the arrangement of merchandise keys. This makes it possible to set the arrangement of merchandise keys of the apparatus according to the operator's mode of use where a plurality of operators share one merchandise register.

Furthermore, according to the invention, the arrangement of merchandise keys corresponding to respective time zones is determined from the sales information of the time zone concerned up to the previous day for the respective time zones, and this arrangement of merchandise keys is taken as the basic arrangement for the time zone concerned. This makes it possible to arrange the merchandise keys for registering well selling items which are variable in each time zone in positions easy for operation in advance.

According to the invention, the stock quantities of items are displayed simultaneously on the merchandise keys. However, a merchandise key for the items whose stock quantity is zero is not provided. This makes it possible to not only check the stock quantity visually but also avoid any erroneous registration of items which are currently out of stock.

Additionally, according to the invention, the input method of item codes and quantities of respective items is switched between a method of using merchandise keys and a method of directly inputting codes on the basis of the sales information. By so doing, it becomes possible to link fast moving and frequently registered items with merchandise keys for ease of input operation and to link slow moving and rarely registered items with a method of directly inputting codes.

By implementing the invention as described above, it becomes possible to improve the operability of the merchandise register, especially in the input operation thereof.

BRIEF DESCRIPTION OF THE DRAWINGS

Other and further objects, features, and advantages of the invention will be more explicit from the following detailed description taken with reference to the drawings wherein:

FIG. 5 is a drawing illustrating a hard code conversion table in memory showing the correspondence between key position numbers and hard codes;

FIG. 6 is a drawing illustrating a key arrangement storing memory contents showing the correspondence between key position numbers and soft codes;

FIG. 8 is a drawing illustrating an item code conversion table in memory showing the correspondence among item codes, key names and soft codes;

FIG. 9 is a drawing illustrating a merchandise registration file in memory as submitted to merchandise registration;

FIG. 10 is a drawing illustrating a memory file in which sales items are ordered according to sales volume;

FIG. 11 is a drawing illustrating the state of the key arrangement storing memory contents after merchandise registration processing has changed it from the state indicated in FIG. 6;

FIG. 21 is a drawing illustrating a sales memory content indicating the sales by time zone of the merchandise register of FIG. 20;

DETAILED DESCRIPTION OF THE PREFERRED EMBODIMENT

Figure 1:
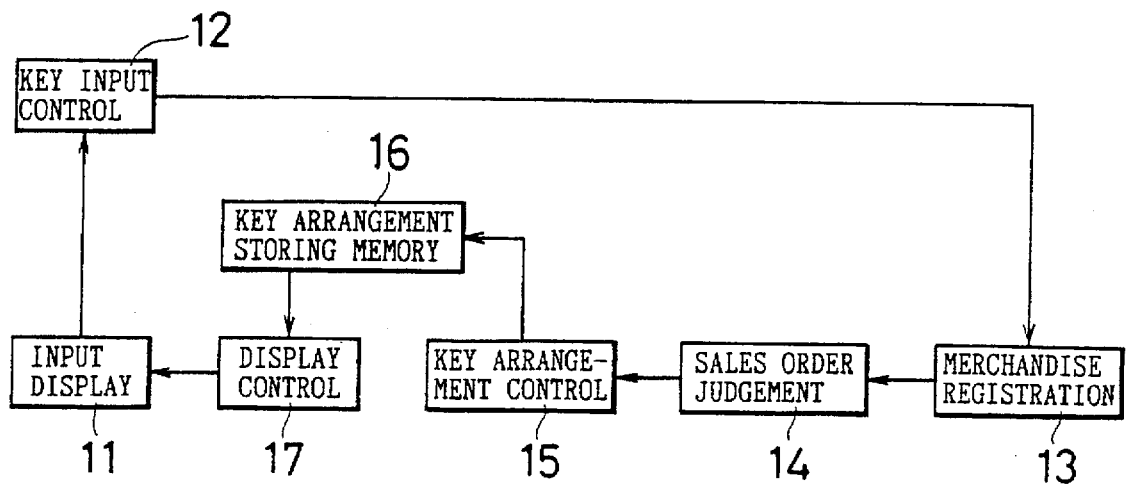
FIG. 1 is a block diagram showing a functional constitution of a merchandise register of a first embodiment of the invention.

Now referring to the drawings, preferred embodiments of the invention are described below.

FIG. 1 is a block diagram showing functional elements of the merchandise register of a first embodiment of the present invention. The merchandise register comprises input and display means 11, key input control means 12, merchandise registration means 13, sales order determining means 14, key arrangement control means 15, a key arrangement memory 16 and display control means 17.

Figure 2:
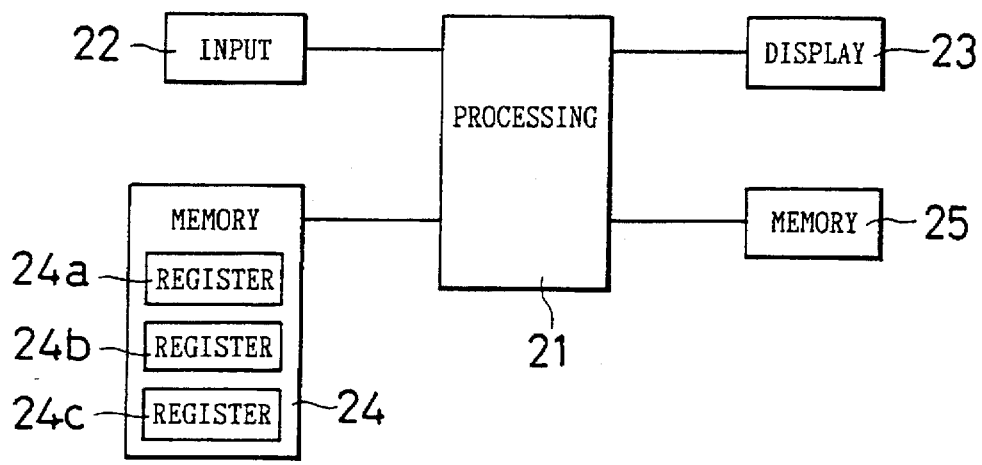
FIG. 2 is a block diagram showing an electrical constitution of the merchandise register of FIG. 1.

FIG. 2 is a block diagram showing a construction of the merchandise register of FIG. 1 wherein processing circuit 21 executes operations for the respective control means etc. of FIG. 1 and constitutes the respective control means etc. Input into the processing circuit 21, are signals from input means 22 obtained by a key panel in which a plurality of light transmitting keys such as touch keys, etc. are included. The processing circuit 21 controls the key arrangement displayed on display means 23 as described below and also performs merchandise registration etc. according to the signals from the input means 22. The input means 22 and the display means 23 constitute the input and display means 11 of FIG. 1.

The processing circuit 21 is also connected to a random access memory 24 and a read only memory 25. In the read only memory 25, the control program of the processing circuit 21, various kinds of tables etc. to be described below are stored. In the random access memory 24, files for storing the key arrangement, sales order, etc. are stored. Moreover, the random access memory 24 also comprises registers 24a, 24b and 24c.

Figure 3:
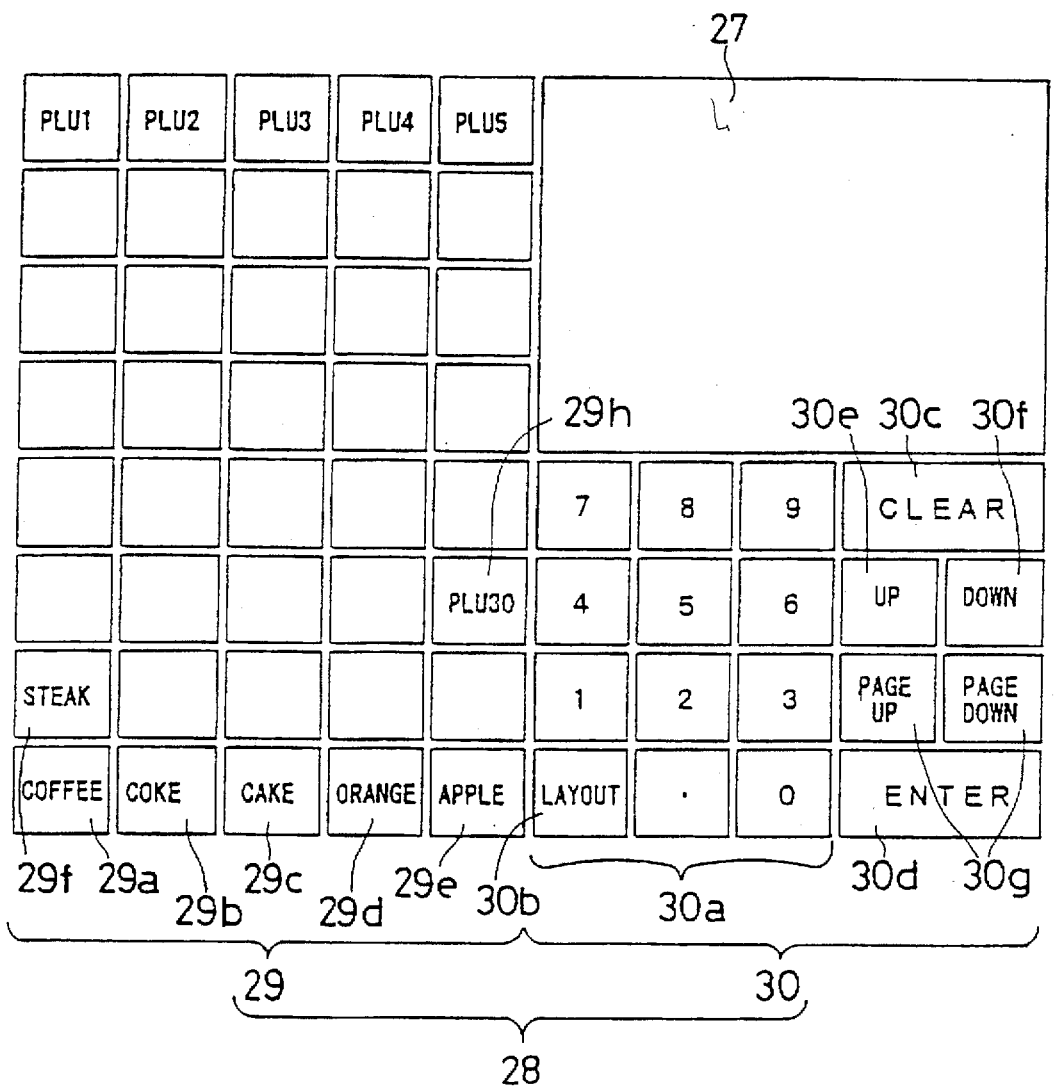
FIG. 3 is a drawing illustrating the state of input/display 11 of FIG. 1 for an example key arrangement for the merchandise register.

FIG. 3 is an exemplary showing of a key arrangement displayed on the display means 23 of the merchandise register of FIG. 1. On the screen of the display means 23, a content display area 27 for displaying the information inputted by key operation is provided along with a key arrangement area 28, wherein the respective keys of the input means 22, indicate what kind of information is inputted by operation of respective keys. In the key arrangement area 28, a product name key group 29 and a function key group 30 are provided. The product name key group 29 assigns one item code to each key. The product name key group 29 has a plurality (e.g., 40) of areas divided in, for example, rectangles. In each area, the merchandise information of the product key used for direct input is displayed. Direct input of an item code is obtained by operating a single key.

In the function key group 30, function keys used for directly inputting the item code of a product and other various kinds of input for registration are provided. The function key group 30 includes a numeral key group 30a for inputting numerals, an automatic layout change switching key 30b, a CLEAR key 30c, an ENTER key 30d, an UP key 30e, a DOWN key 30f and a PAGE key 30g, etc. The numeral key group 30a is used for inputting numerals such as 0 to 9. The automatic change switching key 30b selects an automatic change function for the key arrangement. The CLEAR key 30c erases the information inputted by key operation. The ENTER key 30d inputs the information inputted by using the numeral key group 30a etc. The UP key 30e, DOWN key 30f and PAGE key 30g are used for the setting of the order of arrangement to be described below.

In the respective areas of the product name key group 29, to which individual items are respectively assigned as described below, the areas corresponding to the keys of the input means 22 are indicated and the key names which are merchandise information are also displayed at the same time. In the area indicated with a reference symbol 29a, for example, a key name "COFFEE" is displayed. In the area indicated with a reference symbol 29b, the key name "COKE" is displayed. In the area indicated with the reference symbol 29c, a key name "CAKE" is displayed. In the area indicated with a reference symbol 29d, a key name "ORANGE" is displayed. In the area indicated with a reference symbol 29e, a key name "APPLE" is displayed. In the area indicated with a reference symbol 29f, a key name "STEAK" is displayed.

Moreover, in the area indicated with a reference symbol 29h, "PLU30" is displayed. It shows that the item code can be directly displayed as a key name. In this regard, PLU is an abbreviation of "Price Look Up code".

Referring again to FIG. 1, in the input and display means 11 in providing a display of the key arrangement as indicated in FIG. 3, if any of the keys of the input means 22 corresponding to the product name key group 29 is operated, a hard code is given to the key input control means 12. The hard code is an output signal indicating, i.e., the position information showing the absolute position, the position of the operated key of the input means 22, in the input means 22. With the key input control means 12, soft codes corresponding to the individual item codes are obtained from the hard codes.

Figure 4:
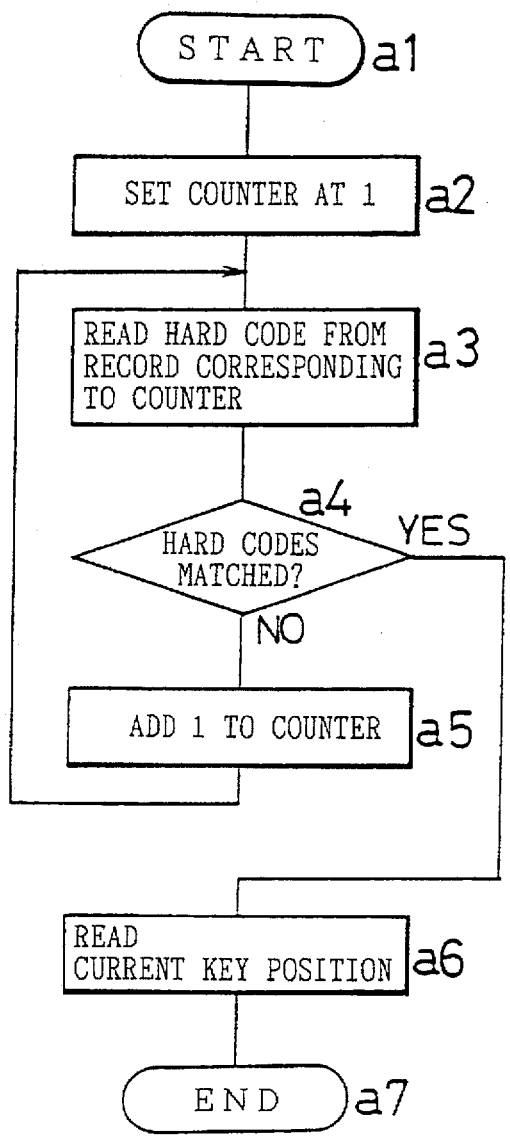
FIG. 4 is a flow chart explaining the processing operation of determining a key position number from a hard code.

FIG. 4 is a flow chart explaining an operation for determining the key position number, which expresses the area displaying the corresponding item on the key arrangement displayed on the display means 23, from the hard code. If a hard code is given to the key input control means 12; the process moves from step a1 to step a2 and sets the value of the counter at, for example, the initial value of 1.

Figure 7:
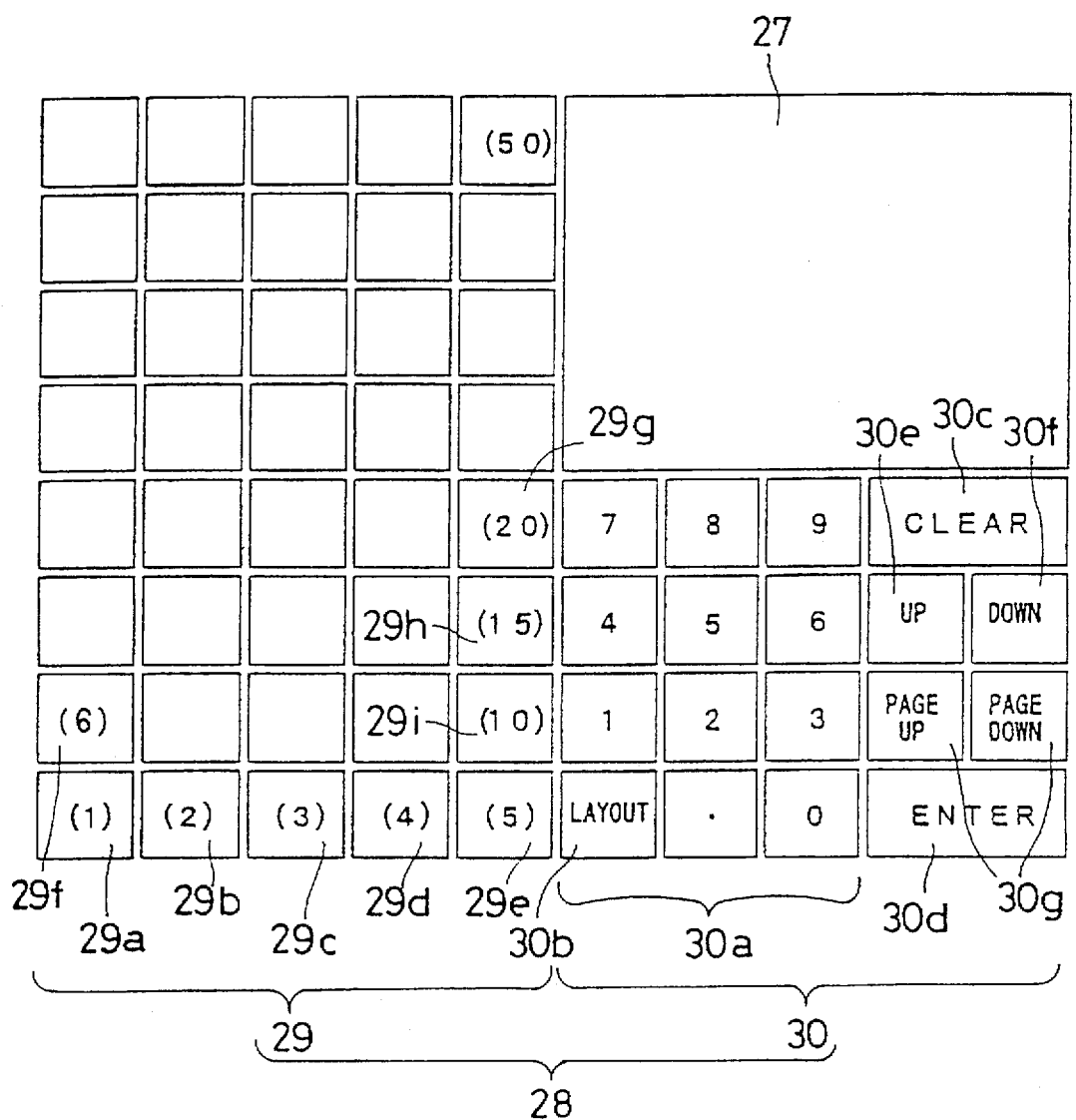
FIG. 7 is a drawing showing key position numbers of the key arrangement of FIG. 3.

In step a3, a hard code is read from the record of addresses corresponding to the value of the counter by using a hard code conversion table 37 stored in the read only memory 25 as indicated in FIG. 5. In the key arrangement shown in FIG. 7, the hard code conversion table 37 indicates the relation between the key position numbers assigned to the respective areas of the product name key group 29 and the hard codes showing the position information of the input means 22 corresponding to the respective areas of the product name key group 29. As shown in FIG. 7, the key position number "1" is assigned to the product name key 29a, which is one of the areas of the product name key group 29, for example. Similarly, the key position numbers "2", "3", "4", "5", "6" are assigned to the product name keys 29b, 29c, 29d, 29e, 29f, respectively. The hard code conversion table 37 has a plurality of records consisting of a key position field 31 which is the storage area for storing key position numbers and a hard code field 32 which is the storage area for storing hard codes.

In step a4, a determination is made whether the hard code read in step a3 agrees with the hard code given from the input and display means 11 to the input control means 12. In the case of disagreement, the process will advance to step a5, where 1 is added to the value of the counter, and then return to step a3. When the two hard codes agrees with each other, the process will advance from step a4 to a6, where the key position number corresponding to the agreed hard code is read from the key position field 31 of the hard code conversion table 37 in FIG. 5, and the process ends itself in step a7.

The input control means 12 determines the key position number indicating which product name key has been operated from the hard code inputted from the input and display means 11. The product name keys are the corresponding area under the key arrangement, namely the area where product names are arranged under the key arrangement displayed on the input and display means 11. Next, the soft code corresponding to this key position number is determined by referring to the key arrangement storing memory 16 in FIG. 6. The key arrangement storing memory 16 indicates the correspondence between the key position numbers and the soft codes, and is included in the random access memory 24.

The key arrangement storing memory 16 has a plurality of records consisting of key position field 33 for storing key position numbers and soft code field 34 for storing soft codes as shown in FIG. 6.

Suppose a hard code "18" is given from the input and display means 11 to the input control means 12. In the input control means 12, the key position number corresponding to the hard code "18" is determined by referring to the hard code conversion table 37 in FIG. 5. As seen from the record 35, the key position number corresponding to the hard code "18" is "3". Next, the soft code corresponding to the key position number "3" is determined by referring to the key arrangement storing memory 16 in FIG. 6. As seen from the record 36, the soft code corresponding to the key position number "3" is "05".

The soft code is given to the merchandise registration means 13. In the merchandise registration means 13, the item codes corresponding to the respective items are determined first from the soft code, by referring to an item code conversion table 43 in FIG. 8. The item code conversion table 43 shows the corresponding relation among soft codes, item codes which are inherent codes specified for the respective items and key names displayed together with the key arrangement on the display means 23, and is stored in the read only memory 25. The item code conversion table 43 has a plurality of records consisting of a soft code field 38 for storing soft codes, an item code field 39 for storing item codes and a key name field 40 for storing key names. For example, when the soft code given from the input control means 12 to the merchandise registration means 13 was "05", we can see from the record 41 that the item code corresponding to the soft code "05" is "005" and that the key name is "APPLE".

Next, merchandise registration of registering and storing sales information is performed by using a merchandise registration file 49 in FIG. 9. The merchandise registration file 49 is stored in the random access memory 24 and has a file composed of a plurality of records. One record consists of a plurality of fields which are storage areas and one record corresponds to one item code. One record of the merchandise registration file 49 is composed of an item code field 44, a quantity field 45, an amount field 46, a stock field 47 and a unit price field 48, etc. The item code field 44 stores the item code of the merchandise corresponding to the record concerned. The quantity field 45 stores the present sales quantity namely the total of the registered quantity of merchandise. The amount field 46 stores the sold amount namely the total of the registered amount of an item. The stock field 47 stores the stock quantity of merchandise. The unit price field 48 stores the unit price of the item corresponding to the record concerned.

in the merchandise registration means 13, the key name corresponding to the item code is determined by referring to the item code conversion table 43 in FIG. 8, from the soft code inputted from the input control means 12. The unit price etc. of the corresponding item are also determined by referring to the merchandise registration file 49 in FIG. 9 and displayed in the content display area 27 on the screen of the input and display means 11.

Moreover, at the merchandise registration means 13 of storing sales quantity etc. in the merchandise registration file 49 in FIG. 9 is performed. For example, the registered quantity which is the sales quantity at the time of one registration input by operating the numeral key group 30a etc. is added to the sales quantity stored in the quantity field 45 namely the sum of the registered quantities. Moreover, the registered amount, which is the sales amount calculated from the registered quantity and the unit price, etc., is also added to the sales amount stored in the amount field 46, namely the sum of the registered amounts. Furthermore, the registered quantity is subtracted from the stock quantity stored in the stock field 47 and the stock quantity of the item concerned is determined and stored. With those operations, the information on sales of an item inputted by using the input and display means 11 can be stored in the merchandise registration file 49.

When merchandise registration means 13 is finished processing, an "order of sales" of the items stored in the merchandise registration file 49 is determined by a sales order judgement determining means 14. FIG. 10 illustrates a memory file 50, representing items (item codes) organized, for example, according to decreasing sales volumes, for determining the order of sales of merchandise. In organizing items based on their sales quantity, for example, one record of memory file 50 is composed of a merchandise code field 51, a quantity field 52 for storing sales quantity forming the subject of determination of order of sales and an order field 53 for storing order. When processing in merchandise registration means 13 is completed, the sales quantity is read from the quantity field 45 and stored in the quantity field 52 of memory file 50 for renewal, for each item code of merchandise registration file 49. After the renewal of sales quantity is over for all item codes stored in memory file 50, a rearrangement of the records of memory file 50 is performed to arrange records (from top to bottom) in the order of decreasing sales quantity. At the same time, a change in the order number stored in the order field 53 is also performed. For example, as illustrated in FIG. 10, the item code having the largest sales is "006" and its sales quantity is "7". The item code having the second largest sales is "004" and its sales quantity is "6," and so on.

When processing is completed by sales order determining means 14, the merchandise register changes the key arrangement according to the aforementioned order of sales by means of the key arrangement control means 15. This consists in assigning the item of the largest sales for the merchandise key corresponding to the key position number "1" indicated in FIG. 7 and the item of second largest sales for the merchandise key corresponding to the key position number "2", etc., for example, so that the key position number and the order may agree with each other. At that time, in the key arrangement storing memory 16 in FIG. 6, for example, the soft code "06" corresponding to the item code "006" is stored in the soft code field 34 of the record having the key position field 33 stored in the key position number "1", and the item code "006" is stored in the item code field 51 of the record where "1" is stored in the order field 53 of the memory file in order of sales volume 50, namely the first order record. The soft code corresponding to the item code can be determined by referring to item code conversion table 43 shown in FIG. 8. The state of key arrangement storing memory 16 after a change of key arrangement is shown in FIG. 11.

The display control means 17 displays key arrangement including key name on the input and display means 11 as shown in FIG. 3. The key name displayed is determined by reading the key name corresponding to the soft code stored in soft code field 38 of key arrangement storing memory 16 from key name field 40 of an item code conversion table 43 as illustrated in FIG. 8. Moreover, the area on input and display 11 in which the key name is to be displayed is determined by reading the key position number stored in key position field 33 of the arrangement storing memory 16. By performing such operations, it becomes possible to dynamically change the key arrangement displayed on input and display means 11 so that key names will be displayed in a positional hierarchy according to the sales volume of each item every time the order of respective sales volumes changes. Thus, with this embodiment, it is also possible to easily identify a poorly selling item from its relative key position on the display.

Moreover, in this embodiment, the key arrangement storing memory 16 (which as previously discussed stores the correspondence between key names, item codes and key positiOon numbers for indicating the area of product name keys on the key arrangement) uses soft codes corresponding to key names and item codes. However, the soft codes occupy less memory compared with item codes. This makes it possible to reduce the volume of key arrangement storing memory 16.

Figure 12:
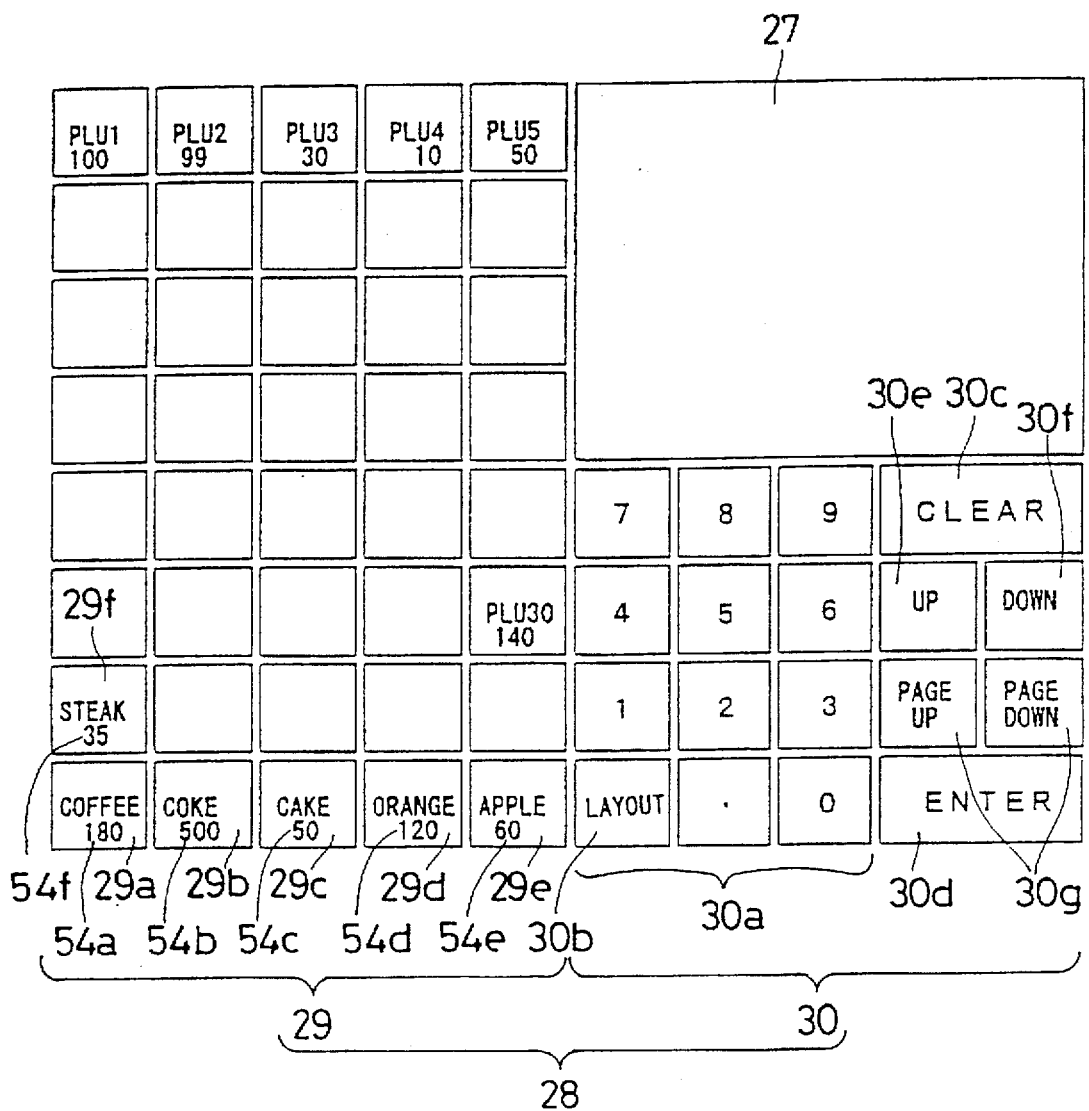
FIG. 12 is a drawing showing the state of the input/display 11 of FIG. 1 for an example key arrangement wherein displayed keys include an indication of the stock quantity corresponding to the item name.

In addition, it is also possible to display a key arrangement that includes key names along with a numeral indication of the quantity (volume of stock of an item using information from stock field 47 in merchandise registration file 49 (FIG. 9), for example, as indicated in FIG. 12 by the reference symbols 54a to 54f. In this case, the display of the key name along with that of the stock quantity are both included on the keys display in the key arrangement. This makes it possible to visually assess the stock quantity of respective items at the time of key input.

Moreover, item codes in the upper orders of the memory file 50 are read out according to the order of merchandise. At the same time, the stock quantity of the merchandise is read from stock field 47 of merchandise registration file 49 when reviewing the data in key arrangement storing memory 16. If the stock quantity for a particular item is zero, it becomes feasible to delete that item code from memory file 50 and advance remaining item codes of orders lower than that of the deleted item code, one by one in turn. By so doing, no soft code corresponding to any item for which the stock quantity is zero remains stored in key arrangement storing memory 16 and it becomes possible to delete (discontinue displaying) the associated product name.

Figure 13:
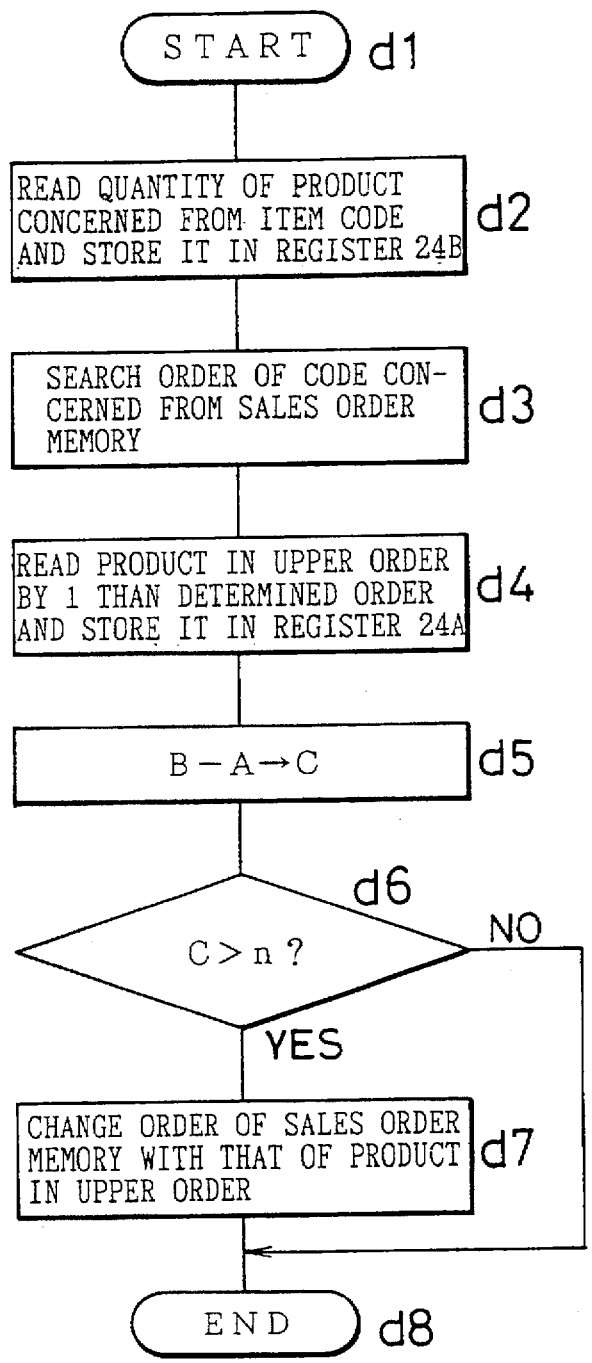
FIG. 13 is a flow chart of an example processing operation for arranging the contents of a memory file, located within the sales order judging means of FIG. 1 in numerical order according to sales volume.

Referring now to FIG. 13, a flow chart is discussed which provides an example of a processor operation for arranging sales items stored in memory file 50 of the sales order judging means 14 of the merchandise register of FIG. 1 in an order ranked according to sales volume. In this example, rearrangement of the hierarchial order of sales volumes is made whenever the sale volume of an item at a lower ranging position in the order has exceeded, by not less than a "prescribed" (predetermined) quantity, the sale volume an item in an immediately higher ranking position. For example, suppose that the sales quantity (volume) of the best selling item is "100," that of the second best selling item is "99" and that of the item in the third order is "80." Five pieces of the item second in the order are then sold, resulting in increasing the total sales quantity of that item to "104." If, at this time, the predetermined prescribed quantity is five pieces, the sales quantity of the item second in the order is larger than that of the item first in rank. However, it is still smaller than the value obtained by adding the "prescribed" quantity to the sales quantity of the item first in the order. Therefore, no rearrangement in the order of sales volumes is made in this case. A change of order between the item first in rank and of that second in rank takes place in a case where the sales quantity of the item second in rank becomes "105" and that of the item first in rank remains "100," as, for example, where the difference in quantity of sales between the two items is not less than five.

Once the process of registration is completed by merchandise registration means 13, corresponding to step d2 in the flow chart of FIG. 13, a sales quantity is read from merchandise registration file 49 (FIG. 9)—specifically from the record in which there was a change in sales quantity— and is stored as sales quantity B in register 24b of memory 24. The record may be looked for by using the item code determined by merchandise registration means 13. In step d3, by referring to memory file 50, a record having the same item code as the record in which the sales quantity read in step d2 was stored is searched for, and the value of order field 53 indicating the item's rank in the order of sales is read. In step d4 a value of quantity field 52, which indicates the quantity (volume) of sales for a particular item that is stored with a rank that is one position higher (i.e., ranked immediately above) the rank position of the item determined in step d3 is searched for, and it is stored as sales quantity A in register 24a of random access memory 24. Next, in step d5, the difference between the sales quantity B and the sales quantity A (i.e., the difference, C, between sales quantity A of the item of an immediately higher rank and sales quantity B of the item submitted for a change or registration) is calculated and stored in the register 24c. In step d6, a judgment is made as to whether the value of the difference C exceeds a predetermined value "n" or not. Processing is terminated at step d8 if C does not exceed n, and in this case, no rearrangement of order will take place. For the case where the value of difference C is judged to exceed the predetermined value "n," the order of the item submitted for a change of registration will be exchanged in order (rank) with the merchandise item ranked immediately above the item concerned, then processing will be terminated in step d8. This makes it possible to prevent frequent changes to the ordered ranking of items by sales volume and the consequent change in key arrangement on the display every time there is any processing of merchandise on the register.

Figure 14:
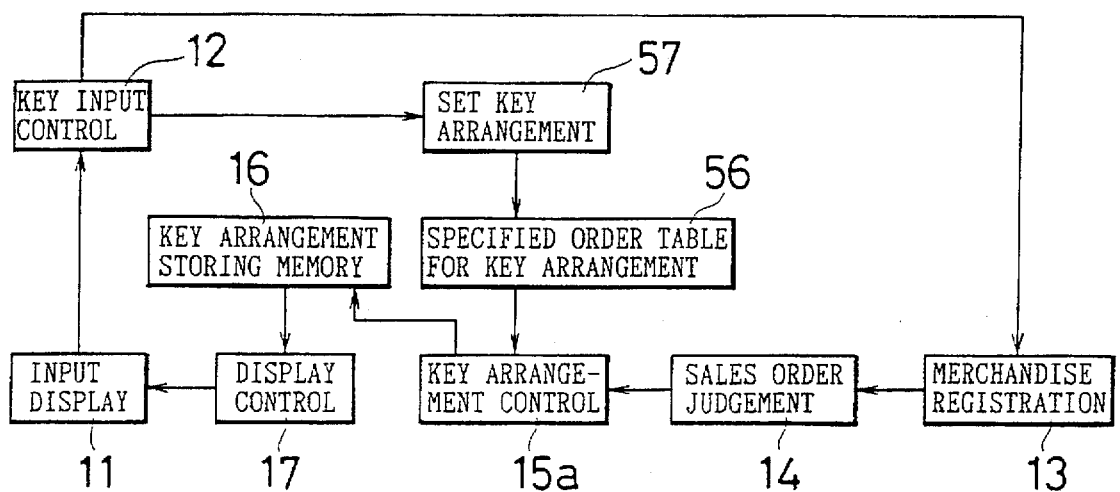
FIG. 14 is a block diagram showing a functional constitution of a merchandise register according to a second embodiment of the invention.
Figures 15, 16:
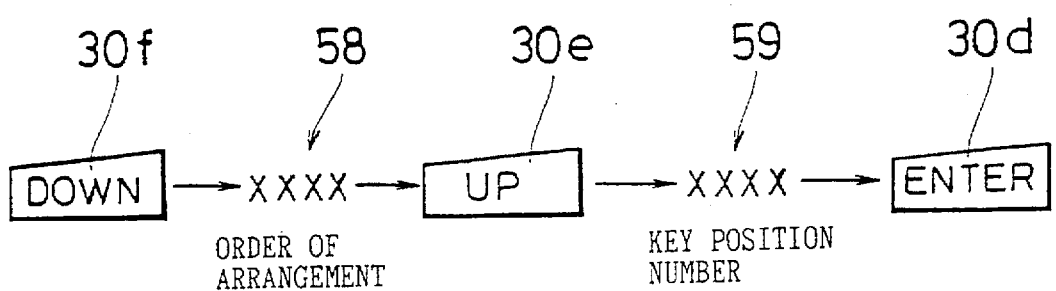
FIG. 15 is a drawing illustrating a specified order table for a key arrangement of the merchandise register of FIG. 14.
FIG. 16 is a drawing illustrating a key operation at the time of setting of the specified order table for the key arrangement of FIG. 15.

FIG. 14 is a block diagram showing a functional representation of the merchandise register for a second embodiment in accordance with the present invention. This embodiment is similar to the first embodiment described earlier and, for that reason, explanation will be omitted by giving the same symbols to means which performs the same processing functions as that of the block diagram in FIG. 1. In this embodiment, an area on the key arrangement for providing correspondence between item codes according to a ranked order of sales volume will be an area optionally set in advance by the operator. When the memory file 50 is rearranged and the processing in merchandise registration means 13 is over, at a key arrangement control means 15a, the displayed key arrangement is changed based on a specified order table. This "specified order table for key arrangement" (56) indicates the correspondence between an item's rank in the order of sales volume and its key position number as shown in FIG. 15. Specified order table '56 has as many records consisting of an order field 58 fro storing an item's rank in order of sales and a key position field 59 (in the number of the product name key group 29).

In the record indicated with a reference symbol 60a, for example, the merchandise in a first (highest) position in the order of sales (sale volume ranking) corresponds to the key position number "20." Similarly, in records 60b, 60c, and 60d, merchandise in the second, third and fourth positions in the order of sale ranking correspond to the key position numbers "15," "10," "5." Namely, they are assigned respectively to areas 29h, 29i, and 29g in FIG. 7. Therefore, areas to which items in higher rank positions in the order of sale ranking are assigned positions on the display where frequently used product name keys are displayed and, thus, can be arranged by the operator to be located at places on the display that are convenient to access or use (e.g., as in the neighborhood of the numeral key 30a).

The specified order table for key arrangement 56 is set by key arrangement setting means 57. Namely, the operator can freely change the table 56 by using the input and display means 11. FIG. 16 is a drawing for explaining the key operation at the time of setting of the specified order table for key arrangement 56. For example, after pressing the DOWN key 30f, the operator inputs an arrangement order, namely numerals to be stored in the sales order field 58 by using the numeral key group 30a. Next, after pressing UP key 30e, the key position number to be stored is inputted, in a manner similar as the order of sales, in the key position field 59, by using the numeral key group 30a. The operator then presses the ENTER key 30d to end the setting. In this way, it is possible to set key arrangement by using keys which originally existed in the key arrangement.

Figure 17:
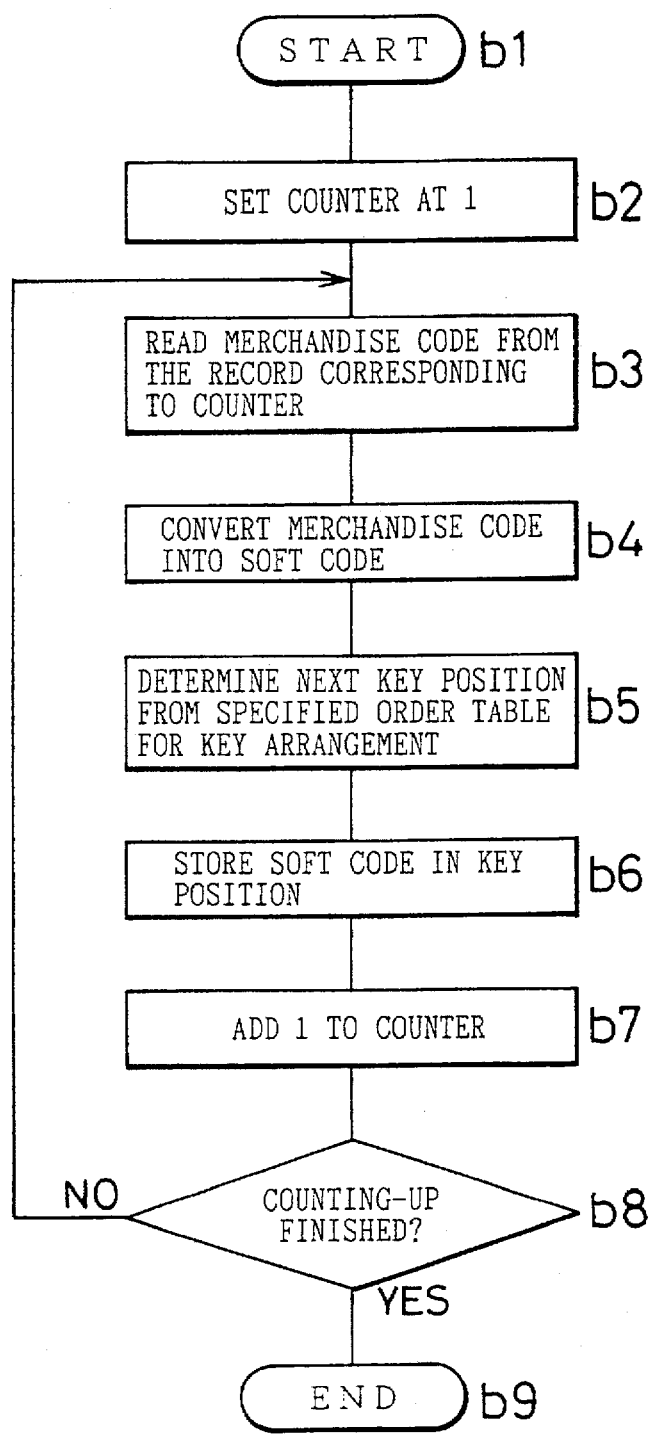
FIG. 17 is a flow chart of an example processing operation for key arrangement control 15a of the merchandise register of FIG. 14.

FIG. 17 is a flow chart for explaining the operation of the key arrangement control means 15a of the merchandise register of FIG. 14. When the processing is over at the sales order judging means 14, the process advances from step b1 to step b2. In step b2, the value on the counter is set at, for example, the initial value of 1, and then goes to step b3. In step b3, the item code is read from the item code field 51 of the record of the address corresponding to the value of the counter in the memory file in order of sales volume 50 in FIG. 10. In step b4, by referring to it refers to the item code conversion table 13 in FIG. 8, the soft code, corresponding to the item code read in step b3, is read.

In step b5, the key position number is read from the record of the address corresponding to the value of the counter in the specified order table for key arrangement 56. In step b6, the soft code read in step b4 is stored in the soft code field 34 inside the key arrangement storing memory 16 corresponding to the key position number read in step b5. In step b7, 1 is added to the value of the counter for renewal. In step b8, judgment is made whether the value of the counter has reached the predetermined value such as total number of records in the key arrangement storing memory 16, for example, and the returns to step b3 when it is judged to have not reached. When the value of the counter reached the predetermined value and the soft code field 34 in the key arrangement storing memory 16 is fully renewed, the processing is terminated in step b9.

With the above processing operations, the setting of key arrangement can be freely changed in the merchandise register which changes the key arrangement according to the order of sales.

Figure 18:
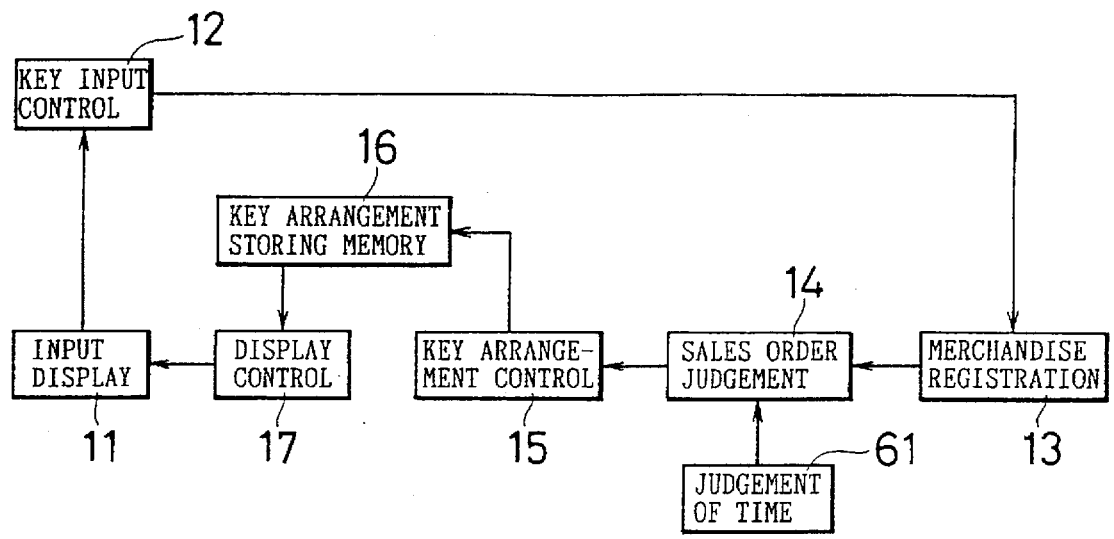
FIG. 18 is a block diagram showing a functional construction of a merchandise register according to a third embodiment of the invention.

FIG. 18 is a block diagram showing a functional constitution of the merchandise register, of a third embodiment of the invention. This embodiment is similar to the first embodiment described above and, for that reason, explanation will be omitted by giving the same symbols to means which performs in the block diagram in FIG.18, the same processing as that of the block diagram in FIG. 1. In this embodiment, changing of key arrangement based on the order of sales is made every prescribed hour.

The sales order judging means 14 judges the order of sales and the timing for renewing the memory file in order of sales volume 50 is controlled by time judging means 61. The time judging means 61 outputs signals every prescribed hours for activating the sales order judging means 14 and renews the memory file in order of sales volume 50 in the sales order judging means 14. Therefore, when the sales order judging means 14 is not activated, the memory file in order of sales volume 50 of FIG. 10 is not changed even if any merchandise registration is made in the merchandise registration means 13 producing changes in sales quantity or in sales amount etc., and there will be no change in the key arrangement displayed on the input and display means 11. This makes it possible to prevent frequent changes in the key arrangement according to the changes in order, of sales every time when any merchandise registration is carried out.

Figure 19:
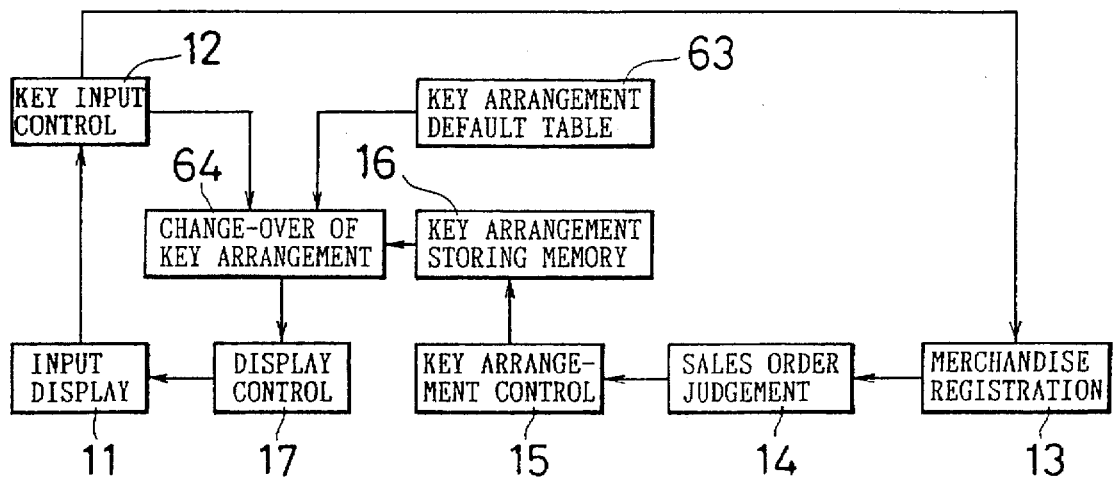
FIG. 19 is a block diagram showing a functional construction of a merchandise register according to a fourth embodiment of the invention.

FIG. 19 is a block diagram showing the functional constitution of the merchandise register which is the fourth embodiment of the invention. This embodiment is similar to the first embodiment described above and, for that reason, explanation will be omitted by giving the same symbols to means which performs in the block diagram in FIG. 19 the same processing as that of the block diagram in FIG. 1. In this embodiment, the operator selects as desired whether or not make any automatic change of key arrangement.

As shown in FIG. 3, the merchandise register of the present invention is provided with an automatic change switching key 30b for switching between a effective state in which automatic key arrangement is effective for automatically changing the key arrangement and a non effective state in which the key arrangement is fixed without any change of key arrangement. The operator switches between the non effective state and the effective state by operating the automatic change switching key 30b.

When the input and display means 11 of FIG. 19 is operated and it is judged that the key operated in the key input control means 12 is the automatic change switching key 30b, the signal from the key input control means 12 is given to key arrangement switching means 64. The key arrangement switching means 64 has a constitution, which alternately changes between the non effective state and the effective state each time when the automatic change switching key 30b is operated. Namely, if the automatic change switching key 30b is operated when the key arrangement switching means 64 is in the effective state, the key arrangement switching means 64 is switched to the non effective state but is switched to the effective state if the automatic change switching key 30b is operated when it is in the non effective state.

In the state where automatic key arrangement is effective, the key arrangement switching means 64 reads the key arrangement data changed according to the order of sales from the key arrangement storing memory 16 and transfers that data to the display control means 17. In the state where automatic key arrangement is non effective, the key arrangement switching means 64 reads the key arrangement data set in advance in a key arrangement default table 63 and not changed according to the order of sales and transfers that data to the display control means 17. The display control means 17 displays the key arrangement data transferred from the key arrangement switching means 64 on the screen of the input and display means 11. This makes it possible for the operator to select whether the key arrangement according to the order of sales be changed.

Figure 20:
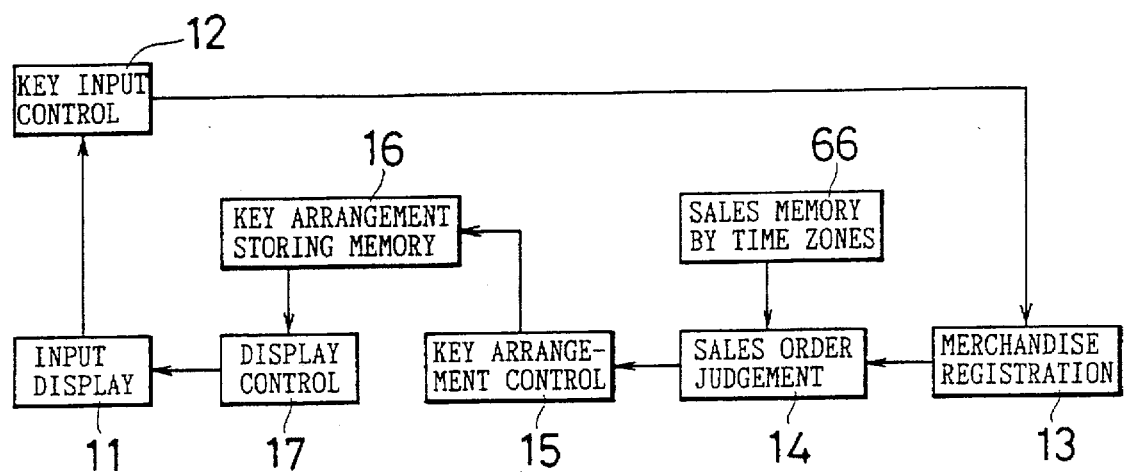
FIG. 20 is a block diagram showing a functional construction of a merchandise register according to a fifth embodiment of the invention.

FIG. 20 is a block diagram showing a functional constitution of a merchandise register of a fifth embodiment of the invention. This embodiment is similar to the first embodiment described earlier and, for that reason, explanation will be omitted by giving the same symbols to means which performs in the block diagram in FIG. 20 the same processing as that of the block diagram in FIG. 1. In this embodiment, the order of sales and the key arrangement are decided every prescribed time zone.

Simultaneously as the processing of registration made at the merchandise registration means 13 and that the merchandise registration file 49 in FIG. 9 is renewed, merchandise registration is also made in a sales-memory-by-time-zones 66. As shown in FIG. 21, in the sales-memory-by-time-zones 66, one record with the item code indicated with the reference symbol 67 corresponds, and the one record concerned consists of a plurality of predetermined time units, or 24 time zone fields 68 if it is given in units of an hour, for example. In one time zone field 68, sales quantity 69 and sales amount 70 of item corresponding to each record in each time zone are stored.

In the sales order judging means 14a the sales quantity 69 in the respective time zone fields 68 is read by referring to the sales memory by time zones 66, and stored in the quantity field 52 of the memory file in order of sales volume 50 and the order of sales is decided for each time zone.

This makes it possible to change the key arrangement to one which is suitable for the respective time zones in the case where the well selling product items vary depending on time zones, for example. Moreover, by preparing a plurality of memory files in order of sales volume 50 for different time zones and determine the order of sales for the respective time zones in advance, it becomes possible to change the key arrangement to one suitable for the specific time zone at the starting hour of the same time zone of the next day.

Figure 22:
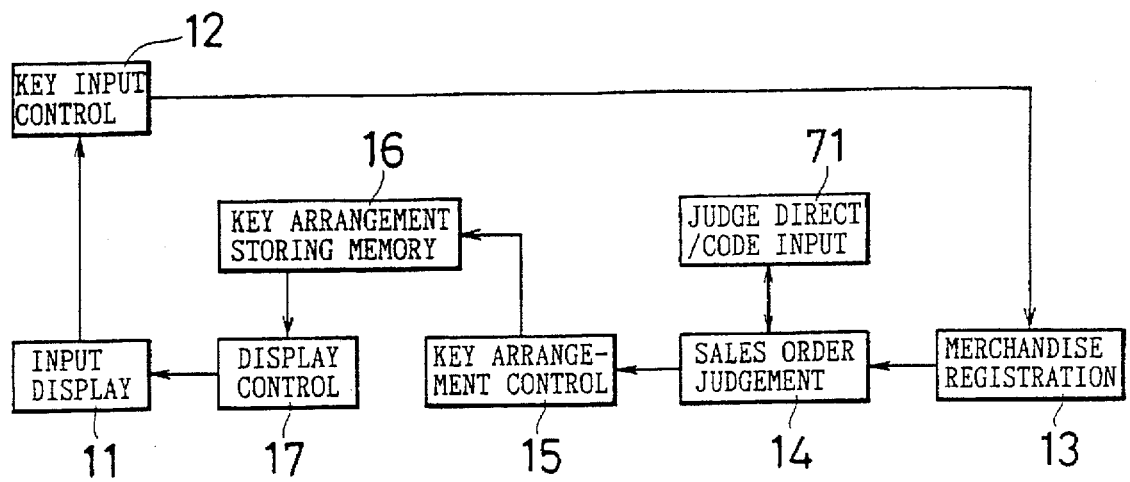
FIG. 22 is a block diagram showing a functional constitution of a merchandise register according to a sixth embodiment of the invention.

FIG. 22 is a block diagram showing the functional constitution of the merchandise register which is a sixth embodiment of the present invention. This embodiment is similar to the first embodiment described earlier and, for that reason, explanation will be omitted by giving the same symbols to means which performs in the block diagram in FIG. 22 the same processing as that of the block diagram in FIG. 1. The product name key group 29 used for direct input is limited in number. Therefore, when handling merchandise in a quantity larger than the number of product name key group 29 and registering sales quantity by using the merchandise register of the present invention, the operator will also use code input for directly inputting item code etc. by means of the numeral key group 30a etc. In this embodiment, the input method of the item codes of respective items will be switched to either direct input or code input according to the order of sales.

The number of records of the memory file in order of sales volume 50 of the sales order judging means 14 will be set at the same number as the number of records of the merchandise registration file, namely the total number of items which can be registered by the merchandise register of the present invention. In the sales order judging means 14, the order of sales of all merchandise items available for registration can be determined by using this memory file in order of sales volume 50. Direct/code input judging means 71 stores in the key arrangement storing memory the soft code corresponding to the items up to the same number as the number of product name keys of the product name key group 29 from the first position in order stored in the order field 53 of the memory file in order of sales volume 50. This makes it possible to treat the items of upper position of order, namely, which are frequently registered submitted to direct input with simple input operation. Moreover, even among the items which were set for direct input, those of lower position of order, namely, which are registered a small number of times, may automatically be switched to those of code input.

Figure 23:
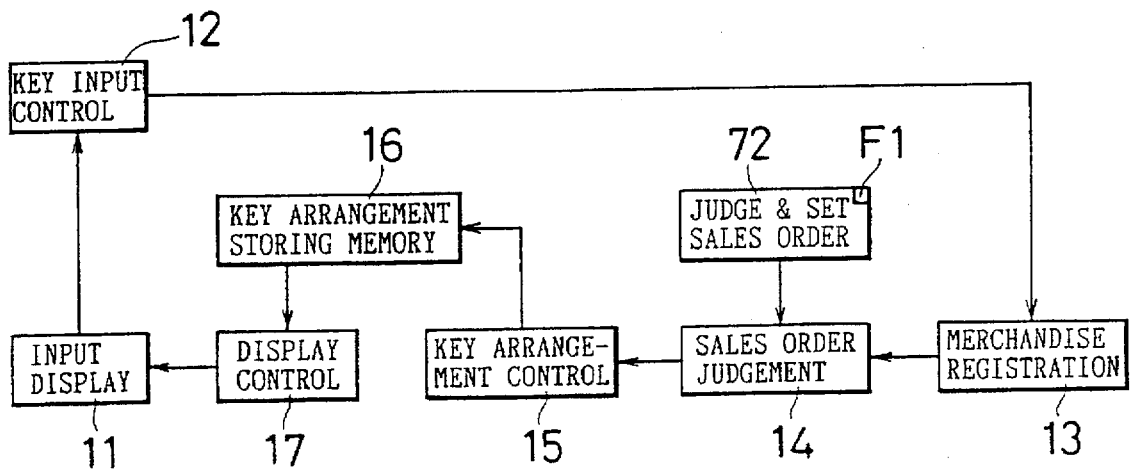
FIG. 23 is a block diagram showing a functional constitution of a merchandise register according to a seventh embodiment of the invention.

FIG. 23 is a block diagram showing a functional constitution of the merchandise register which is a seventh embodiment of the invention. This embodiment is similar to the first embodiment described above and, for that reason, explanation will be omitted by giving the same symbols to means which performs in the block diagram in FIG. 23 the same processing as that of the block diagram in FIG. 1. In this embodiment, the object of discrimination for deciding the order of sales will be switched to either sales quantity or amount of sales.

Figure 24:
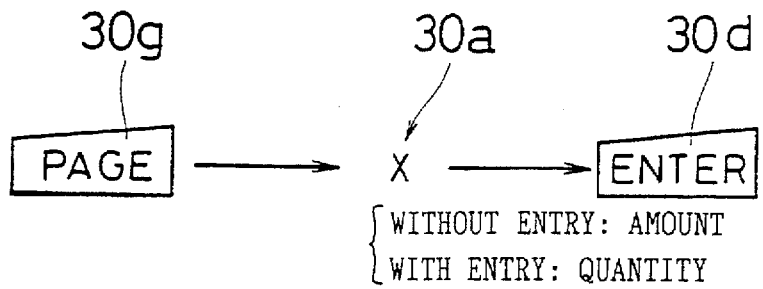
FIG. 24 is a drawing illustrating a key operation at the time of setting of sales order determining function of FIG. 23.
Figure 25:
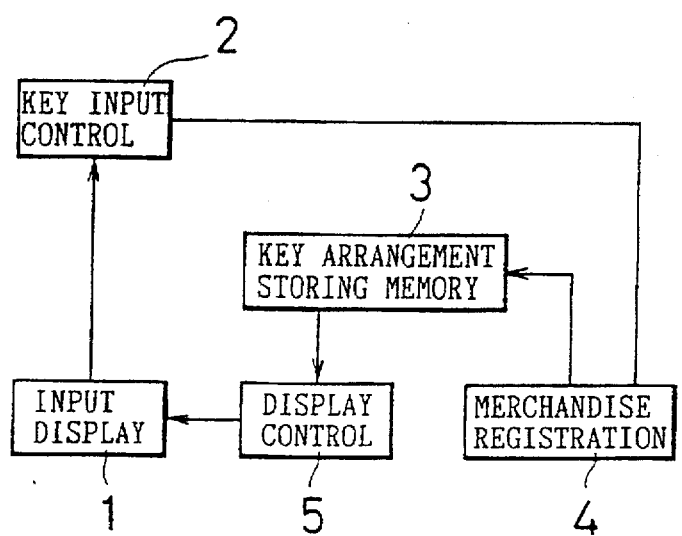
FIG. 25 is a block diagram showing a functional constitution of a conventional prior art merchandise register.

Sales order judging and setting means 72 switches, in the sales order judging means 14, the data to be stored in the quantity field 52 in which the object of discrimination for deciding the order of sales in the memory file in order of sales volume 50 of FIG. 10 is stored, to either sales quantity or amount of sales. FIG. 24 shows an example of operation at the time of setting of the sales order judging and setting means 72. To store the sales quantity in the quantity field 52, for example, the PAGE key 30g in the key arrangement shown in FIG. 3 then, a desired key of the numeral key group 30a and lastly the ENTER key 30d are operated. By this operation, sales quantity is set as the object of discrimination. Moreover, when storing the sales amount in the field 52, the ENTER key 30d is operated after operating the PAGE key 30g. By this operation, sales amount is set as the object of discrimination.

In this way, a flag F1 in the sales order judging and setting means 72 is set at "1" or reset to "0" depending on whether a desired key of the numeral key group 30a is operated or not between the operation of the PAGE key 30g and the operation of the ENTER key 30d. The sales order judging means 14 decides the data to be stored in the field 52 of the memory file in order of sales volume 50 as either sales quantity or amount of sales by referring to the flag F1 and judges the order of sales by using the data stored in the field 52. With such operations, the order of sales can be determined on the basis of either the sales quantity or the amount of sales.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A merchandise register comprising:

input and display means for inputting and displaying information regarding a product item, a stock quantity, and/or operations necessary for a registration of said product item;

sales information storing means for storing sales information for a plurality of items including a sales quantity and a sales amount for each item; and a processing means for cumulatively registering a sales quantity and/or a sales amount in the sales information storing means in response to information input via the input and display means, wherein the input and display means includes a merchandise input and display means for registering item sales and for displaying merchandise keys corresponding to individual items, each merchandise key having item identification information displayed within its associated region, said merchandise input means comprising:

a merchandise key panel display having a plurality of displayed merchandise keys arranged in rows and columns on a touch sensitive display screen, and control means for controlling the display means so that item identification information representing a product item is displayed within a region on the display defining a displayed merchandise key, an item code corresponding to a product item identified on a displayed merchandise key is generated in response to a touch operation of said displayed merchandise keys, and an existing displayed arrangement of the merchandise keys is modified based on cumulative registered sales information by interchanging item identification information displayed within regions defining said displayed merchandise key.

2. The merchandise register of claim 1, wherein the merchandise input means comprises:

order judging means for calculating an index value for each item according to a predetermined procedure prescribed on the basis of the sales information and judging a hierarchial order for an item on the basis of a magnitude of the index value, order storing means for storing a display key position value representing an arranged display screen position for keys displayed on the merchandise key panel and a corresponding value representing a relative hierarchial order of an item with respect to other items, and setting means for setting a value representing the order of an item corresponding to the key position in the order storing means, wherein the control means changes the arrangement of the merchandise keys by referring to the order storing means based on an outcome of judging by the order judging means.

3. The merchandise register of claim 2, wherein the order judging means changes the order of an item with that of an item one position higher in hierarchial order when the index of an item has exceeded the sum of the index of said item one position higher in hierarchial order and a predetermined prescribed value.

4. The merchandise register of claim 2, wherein the order judging means judges the hierarchial order of an item by using sales quantity or sales amount as an index, and the input and display means comprises selecting means for selecting either sales quantity or sales amount as an index.

5. The merchandise register of claim 1, wherein the control means changes the arrangement of the merchandise keys at predetermined prescribed hours.

6. The merchandise register of claim 1, wherein the input and means comprises switching means for activating and disabling the change of arrangement of the merchandise keys by the control means.

7. The merchandise register of claim 1, wherein the sales information storing means stores sales information of product items up to a previous day for a plurality of prescribed time zones, and the control means changes the displayed arrangement of merchandise keys on the basis of sales information accumulated up to the previous day of a predetermined prescribed time zone, wherein changes are made to a displayed arrangement of merchandise keys at commencing hours for respective time zones.

8. The merchandise register of claim 1, wherein the sales information storing means stores the stock quantity of each item, and the control means constitutes merchandise keys by displaying the stock quantity together with merchandise information.

9. The merchandise register of claim 8, wherein the control means displays neither merchandise information nor stock quantity for an item the stock quantity of which is zero.

10. The merchandise register of claim 1, wherein the input and display means further comprises code input means for directly inputting item codes of all traded items, and wherein the number of merchandise keys displayed is less than the number of all traded items for which sales information is stored, and the control means further comprises means for selecting which item will constitute a displayed merchandise key on the basis of accumulated sales information.

* * * * *